United States Patent
Jo et al.

(10) Patent No.: US 11,101,595 B2
(45) Date of Patent: Aug. 24, 2021

(54) MOBILE TERMINAL

(71) Applicant: LG ELECTRONICS INC., Seoul (KR)

(72) Inventors: Junghyun Jo, Seoul (KR); Jangwoo Hong, Seoul (KR); Hoseok Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/641,566

(22) PCT Filed: Jun. 27, 2018

(86) PCT No.: PCT/KR2018/007294
§ 371 (c)(1),
(2) Date: Feb. 24, 2020

(87) PCT Pub. No.: WO2020/004685
PCT Pub. Date: Jan. 2, 2020

(65) Prior Publication Data
US 2020/0176920 A1 Jun. 4, 2020

(51) Int. Cl.
*H01R 13/52* (2006.01)
*H01R 12/72* (2011.01)
(Continued)

(52) U.S. Cl.
CPC ....... *H01R 13/5202* (2013.01); *H01R 12/727* (2013.01); *H01R 13/405* (2013.01); *H01R 13/631* (2013.01)

(58) Field of Classification Search
CPC .. H01R 13/405; H01R 13/52; H01R 13/5202; H01R 13/631; H01R 12/72; H01R 12/727
See application file for complete search history.

(56) References Cited

U.S. PATENT DOCUMENTS 9,426,919 B2 * 8/2016 Wee .................. H05K 7/14
9,853,393 B2 * 12/2017 Guo .................. H01R 24/60
(Continued)

FOREIGN PATENT DOCUMENTS

JP 2015088808 5/2015
KR 101398266 6/2014
(Continued)

OTHER PUBLICATIONS

PCT International Application No. PCT/KR2018/007294, International Search Report dated Mar. 26, 2019, 2 pages.

*Primary Examiner* — Oscar C Jimenez
(74) *Attorney, Agent, or Firm* — Lee, Hong, Degerman, Kang & Waimey

(57) ABSTRACT

The present disclosure relates to a mobile terminal including: a circuit board provided in a case; a connector mounting part penetrating one side of the case and enabling connection with an external device; and a connector combined with the circuit board and provided in the connector mounting part, wherein the connector includes: a connector body mounted and installed on the connector mounting part so that the rear end portion is supported by the case; and a terminal part which is combined with the connector body, and in which a plurality of contact pins are molded for connection with an external device, and which extends toward the connector mounting part, wherein a waterproofing member is provided between the connector mounting part and the connector body to block the movement of fluid introduced through the connector mounting part.

9 Claims, 8 Drawing Sheets

(51) Int. Cl.
*H01R 13/405* (2006.01)
*H01R 13/631* (2006.01)

(56) References Cited

U.S. PATENT DOCUMENTS

| | | | |
|---|---|---|---|
| 10,027,052 B2 * | 7/2018 | Yudate | H01R 13/5202 |
| 10,446,972 B2 * | 10/2019 | Ono | H01R 13/5025 |
| 2010/0163303 A1 | 7/2010 | Ambo et al. | |
| 2012/0315779 A1 * | 12/2012 | Yudate | H01R 12/724 |
| | | | 439/271 |
| 2015/0380862 A1 * | 12/2015 | Song | H01R 24/62 |
| | | | 439/559 |
| 2017/0271809 A1 * | 9/2017 | Fujii | H01R 13/6581 |
| 2018/0294598 A1 * | 10/2018 | Lee | H01R 13/5213 |
| 2019/0245302 A1 * | 8/2019 | Ozasa | H01R 13/52 |
| 2020/0259292 A1 * | 8/2020 | Hsu | H01R 13/5202 |

FOREIGN PATENT DOCUMENTS

| | | |
|---|---|---|
| KR | 20140142997 | 12/2014 |
| KR | 20160128828 | 11/2016 |

\* cited by examiner

MOBILE TERMINAL

CROSS-REFERENCE TO RELATED APPLICATIONS

This application is the National Stage filing under 35 U.S.C. 371 of International Application No. PCT/KR2018/007294, filed on Jun. 27, 2018, the contents of which are all hereby incorporated by reference herein in its entirety.

TECHNICAL FIELD

The present disclosure relates to a structure of a mobile terminal including a connector for connecting the mobile terminal to an external device.

BACKGROUND ART

Terminals may be divided into mobile/portable terminals and stationary terminals according to mobility. Also, mobile terminals may be classified into handheld types and vehicle mount types according to whether or not a user can directly carry.

A terminal has various functions according to development of technologies. For example, an electronic device can capture still images or moving images, play music or video files, play games, receive broadcast and the like, so as to be implemented as an integrated multimedia player. Efforts are ongoing to support and increase the functionality of electronic devices. Such efforts include software improvements, as well as changes and improvements in the structural components.

In recent years, as the terminal becomes simple in design and thin in thickness, various electronic components are arranged inside in a close contact manner. Therefore, a structure of the terminal needs to be further simplified by minimizing the components of the terminal. In addition, since various electronic components are located inside the terminal in a compact manner, the electronic components and others may be fatally affected when fluid is introduced into the terminal, and this may cause deterioration in performance and reliability of the terminal. And since fluid (water) is highly likely to flow into the terminal through a connection port, fluid inflow needs to be blocked.

A connection port connected to an external device for data transmission or battery charging is installed on one side of a case of the mobile terminal. In the related art, in order to configure a connection port, a connector coupled to a flexible printed circuit board was fitted in a connector mounting portion and fixed to a shell covering the connector by using additional brackets, and then a main circuit board was additionally connected to the flexible printed circuit board. This made a structure complicated and thus increased assembly processes.

In addition, the connection port of the related art mobile terminal had a structure that an upper shell was covering a lower shell in which the connector was accommodated. Thus, fluid was highly likely to be introduced inside the terminal through not only contact pins mounted to the connector, but also a gap between the upper shell and the lower shell.

Therefore, researches on a connector which can be simplified in manufacturing process by virtue of a simple structure and easily block a flow of fluid introduced into a terminal through a connection port, and a structure of a mobile terminal having the same, are needed.

DETAILED DESCRIPTION OF THE DISCLOSURE

Technical Problem

One aspect of the present disclosure is to solve the above-mentioned and other problems and to provide a structure of a mobile terminal, capable of securing easiness in assembly, by further simplifying a structure of a connector with a configuration of a connection port for connecting a mobile terminal to an external device.

Another aspect of the present disclosure is to provide a structure of a mobile terminal including a connector that can easily block inflow of fluid into the mobile terminal through a connector mounting portion.

Technical Solution

To achieve this aspect and other advantages, a mobile terminal according to an embodiment of the present disclosure may include a case, a circuit board installed in the case, a connector mounting portion formed through one side of the case to be connected with an external device, and a connector coupled to the circuit board and installed in the connector mounting portion, wherein the connector includes a connector body seated on the connector mounting portion and having a rear end portion installed to be supported by the case, and a terminal portion coupled to the connector body, having a plurality of contact pins molded thereto for connection with the external device, and extending toward the connector mounting portion, and wherein a waterproofing member is installed between the connector mounting portion and the connector body to prevent fluid from being introduced through the connector mounting portion.

According to an embodiment of the present disclosure, the connector body includes a pin supporting portion covering an upper surface and a lower surface of the terminal portion to support respective contact pins and contacting with the external device; a stepped portion protruding from the pin supporting portion in an up-down direction, and inserted into the connector mounting portion to be in contact with an inner side surface of the connector mounting portion; and a case fixing portion extending from an upper end portion of the stepped portion and installed to be fixed to one side of the case.

According to an embodiment of the present disclosure, the connector body may further include a pin receptor portion installed on a lower end portion of the case fixing portion, supporting a plurality of contact pins passing through the stepped portion, and contacting the circuit board.

In this case, a waterproofing portion may be installed in a space created by the case fixing portion and the pin receptor portion, and is molded with respective contact pins so as to block inflow of fluid passing through the stepped portion and flowing along surfaces of each contact pin.

According to an embodiment of the present disclosure, the waterproofing portion is made of a waterproof material to block the inflow of fluid, and be installed to surround and be in close contact with outer surfaces of each contact pin.

According to an embodiment of the present disclosure, the connector mounting portion may include a protrusion protrudes toward the connector; and a connector supporting portion coupled to a front surface portion of the protrusion and configured to support the connector.

At this time, the protrusion guides an insertion of a plug for connection with the external device.

According to an embodiment of the present disclosure, the waterproofing member is positioned to be attached to one surface of the connector supporting portion and be in close contact with the connector body, and can block fluid introduced from the connector mounting portion.

According to an embodiment of the present disclosure, the waterproofing member may be formed in an O-ring shape.

According to an embodiment of the present disclosure, the waterproofing member may integrally cover one surface of the connector supporting portion and an inner surface of a hole provided in the connector supporting portion, and thus can block the fluid introducing from outside.

Advantageous Effects

In the mobile terminal having the above structure, a shell covering a connector is omitted to reduce the number of needed components, and thus a fabricating cost can be reduced. Also, a fabricating process can be simplified, since the connector may be located in a connector mounting portion after the connector is directly coupled to a main circuit board.

In addition, the connector mounting portion is provided with a waterproofing member and thereby blocking fluid flowing into the terminal. And inflow of fluid flowing along a surface of a plurality of contact pins can be blocked by a waterproofing portion installed in a connector body. This configuration prevents its reliability from being lowered by a performance of electronic elements and a circuit board located inside the terminal affected by the inflow of fluid.

MODES FOR CARRYING OUT PREFERRED EMBODIMENTS

Figure 1A:
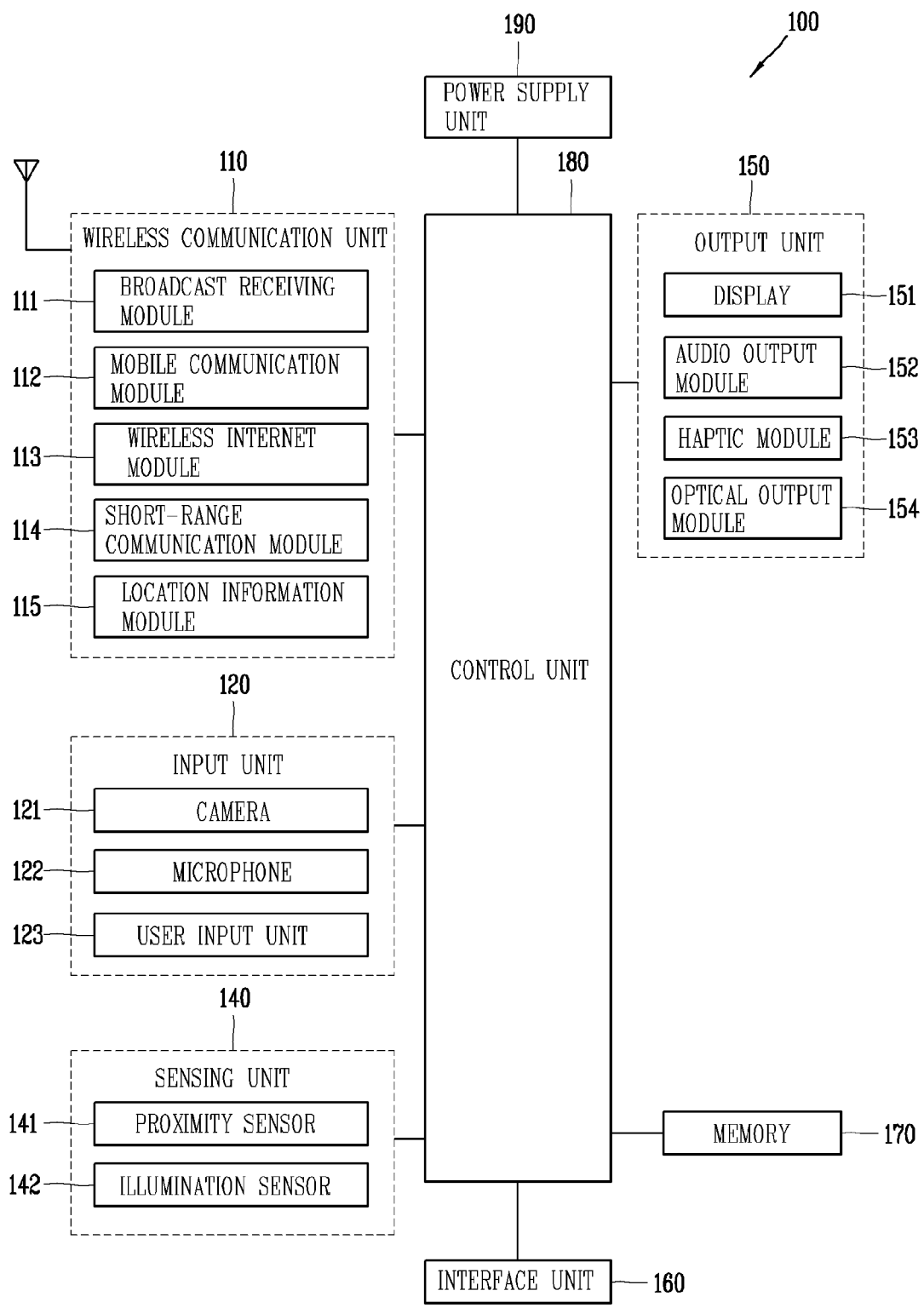
FIG. 1A is a block diagram for explaining a mobile terminal according to the present disclosure.

FIG. 1A is a block diagram for explaining a mobile terminal 100 related to the present disclosure.

The mobile terminal 100 may be shown having components such as a wireless communicator 110, an input unit 120, a sensing unit 140, an output unit 150, an interface unit 160, a memory 170, a controller 180, and a power supplier 190. FIG. 1 shows the mobile terminal 100 having various components, but it may be understood that implementing all of the illustrated components is not a requirement. Greater or fewer components may alternatively be implemented.

Among others, the wireless communicator 110 may typically include one or more modules which permit communications such as wireless communications between the mobile terminal 100 and a wireless communication system, communications between the mobile terminal 100 and another electronic device, or communications between the mobile terminal 100 and an external server. Further, the wireless communicator 110 may typically include one or more modules which connect the mobile terminal 100 to one or more networks.

The wireless communicator 110 may include one or more of broadcast receivers 111, a mobile communicator 112, a wireless Internet module 113, a short-range communicator 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal 100, the surrounding environment of the mobile terminal 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors, and combinations thereof.

The output unit 150 may typically be configured to output various types of information, such as audio, video, tactile output, and the like. The output unit 150 may include at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least one of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supplier 190 may be configured to receive external power or provide internal power in order to supply appropriate power required for operating elements and components included in the mobile terminal 100. The power supplier 190 may include a battery, and the battery may be configured as an embedded battery or a replaceable battery.

At least part of the components may cooperatively operate to implement an operation, a control or a control method of the mobile terminal 100 according to various embodiments disclosed herein. Also, the operation, the control or the control method of the mobile terminal 100 may be implemented on electronic device by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communicator 110, the broadcast receiver 111 is configured to receive a broadcast signal and/or broadcast associated information from an external broadcast managing server via a broadcast channel. The broadcast channel may include a satellite channel, a terrestrial channel, or both. In some embodiments, two or more broadcast receivers may be utilized to facilitate simultaneous reception of two or more broadcast channels, or to support switching among broadcast channels.

The mobile communicator 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communicator 112.

The short-range communicator 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communicator 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal may be a wearable device, for example, a smart watch, a smart glass or a head mounted display (HMD), which is able to exchange data with the mobile terminal 100 (or otherwise cooperate with the mobile terminal 100). The short-range communicator 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communicator 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the electronic device. As an example, the location information module 115 includes a Global Position System (GPS) module, a Wi-Fi module, or both. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally perform a function of any of the other modules of the wireless communicator 110 to obtain data related to the position of the mobile terminal 100. The location information module 115 is a module used for acquiring the position (or the current position) of the mobile terminal 100, and may not be limited to a module for directly calculating or acquiring the position of the mobile terminal.

Next, the input unit 120 is configured to permit various types of inputs to the mobile terminal 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display 151 or stored in memory 170. Meanwhile, the cameras 121 provided in the mobile terminal 100 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function (or application program) being executed in the mobile terminal 100. The microphone 122 may include assorted noise removing algorithms to remove unwanted noise generated in the course of receiving the external audio signal.

The user input unit 123 is a component that permits input by a user. Such user input may enable the controller 180 to control an operation of the mobile terminal 100 to correspond to input information. The user input unit 123 may include a mechanical input element (or a mechanical key, for example, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like, and generates a corresponding sensing signal. The controller 180 generally cooperates with the sending unit 140 to control operation of the mobile terminal 100 or execute data processing, a function or an operation associated with an application program installed in the mobile terminal 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 may process data corresponding to proximity touches and proximity touch patterns sensed by the proximity sensor 141, and cause visual information corresponding to the processed data to be output on the touch screen. In addition, the controller 180 may control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to a type of an object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the object in vicinity of the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communicator 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the electronic device therethrough. Various command signals or power input from the cradle may operate as signals for recognizing that the mobile terminal 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supplier 190 may receive external power or internal power and supply appropriate power required for operating respective elements and components under the control of the controller 180. The power supplier 190 may include a battery, which is typically rechargeable or be detachably coupled to the terminal body for charging.

The power supplier 190 may include a connection port. The connection port may be configured as one example of the interface unit 160 to which an external charger for supplying power to recharge the battery is electrically connected.

As another example, the power supplier 190 may be configured to recharge the battery in a wireless manner without use of the connection port. In this example, the power supplier 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the mobile terminal 100 according to the one embodiment of the present disclosure illustrated in FIG. 1A or a terminal having those components, with reference to FIGS. 1B and 10.

Figure 1B:
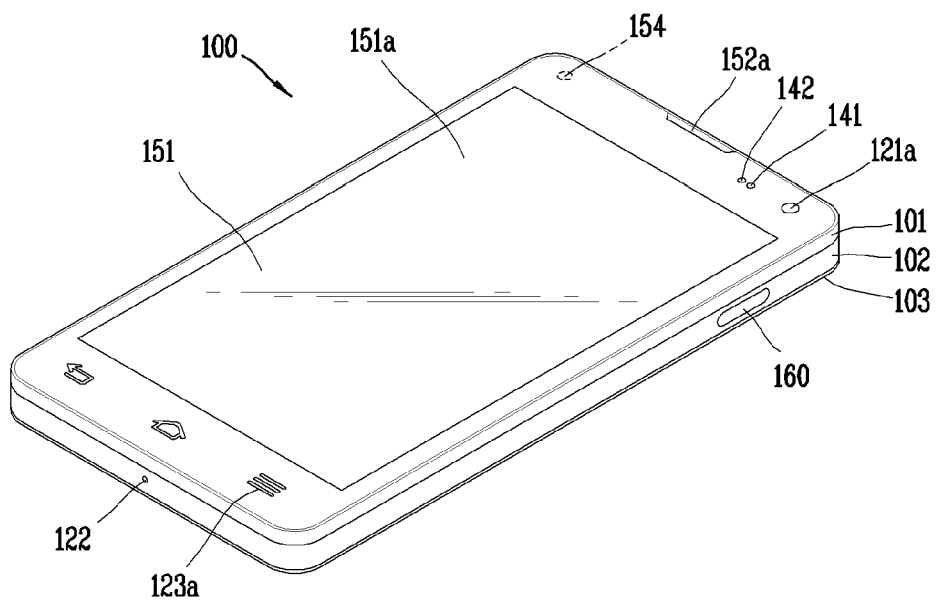
FIG. 1B is a perspective view of a front surface portion of the mobile terminal viewed from outside.
Figure 1C:
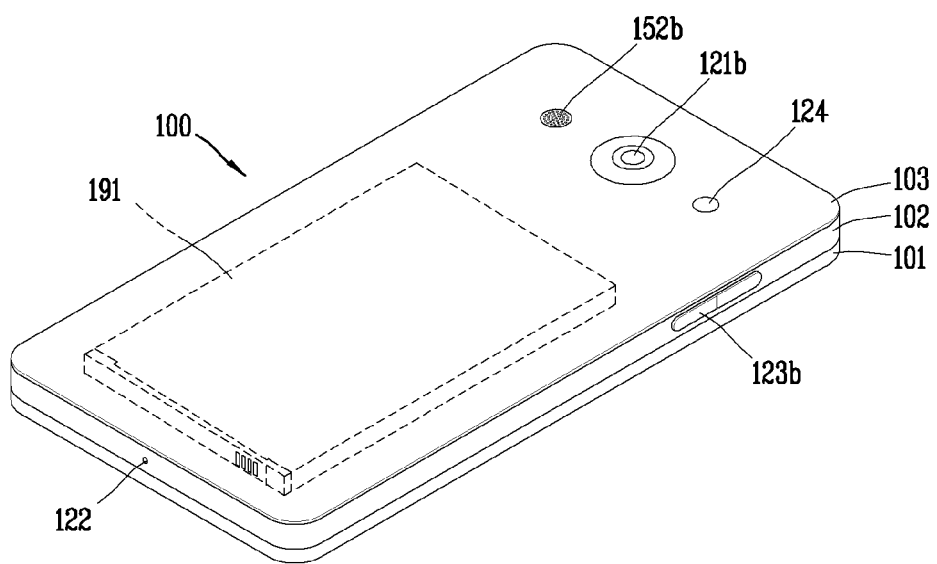
FIG. 1C is a perspective view of a rear surface portion of the mobile terminal viewed from outside.

Referring to FIGS. 1B and 10, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into an inner space formed between the front case 101 and the rear case 102. At least one middle case may be additionally positioned between the front case 101 and the rear case 102.

The display 151 is shown located on a front side of the terminal body to output information. As illustrated, a window 151a of the display 151 may be mounted in the front case 101 to form a front surface of the terminal body together with the front case 101.

In some embodiments, electronic components may also be mounted in the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted in the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 300. Meanwhile, the rear cover 103 may include an opening for externally exposing a camera 121b or the audio output module 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases creates an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing portion (not shown) for preventing introduction of water into the terminal body. For example, the waterproofing portion may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display 151, first and second audio output module 152a and 152b, a proximity sensor 141, an illumination sensor 142, an optical output module 154, first and second cameras 121a and 121b, first and second manipulators 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display 151, the first audio output module 152a, the proximity sensor 141, the illumination sensor 142, the optical output module 154, the first camera 121a, and the first manipulator 123a, the side surface of the terminal body is shown having the second manipulator 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulator 123a may be located on another surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-LCD (TFT LCD), an organic light-emitting diode (OLED), a flexible display, a three-dimensional (3D) display and an e-ink display.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and the controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between the window 151a and a display (not shown) on a rear surface of the window 151a, or may be a metal wire directly patterned on the rear surface of the window 151a. Alternatively, the touch sensor may be formed integrally with the display. For example, the touch sensor may be disposed on a substrate of the display, or may be provided inside the display.

In this way, the display 151 may form a touch screen together with the touch sensor, and in this case, the touch screen may function as the user input unit 123 (see FIG. 1A). In some cases, the touch screen may replace at least some of functions of a first manipulator 123a. Hereinafter, for the sake of explanation, the display (display module) for outputting the image and the touch sensor are collectively referred to as a touch screen 151.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulators 123a and 123b are examples of the user input unit 123, which may be manipulated by a user to provide input to the mobile terminal 100. The first and second manipulators 123a and 123b may also be commonly referred to as a manipulating portion. The first and second manipulators 123a and 123b may employ any method if it is a tactile manner allowing the user to perform manipulation with a tactile feeling such as touch, push, scroll or the like. The first and second manipulators 123a and 123b may also be manipulated through a proximity touch, a hovering touch, and the like, without a user's tactile feeling.

The drawings are illustrated on the basis that the first manipulator 123a is a touch key, but the present disclosure may not be necessarily limited to this. For example, the first manipulator 123a may be configured with a mechanical key, or a combination of a touch key and a push key.

The content received by the first and second manipulators 123a and 123b may be set in various ways. For example, the first manipulator 123a may be used by the user to input a command such as menu, home key, cancel, search, or the like, and the second manipulator 123b may be used by the user to input a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least some of functions of the first manipulator 123a located on the front surface of the terminal body. Accordingly, when the first manipulator 123a is not disposed on the front surface of the terminal body, the display 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

In particular, a connector mounting portion 203 for configuring a connection port for power charging may be provided on the side surface of the case 102.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiver 111 (see FIG. 1A) may be retractable into the terminal body. Alternatively, an antenna may be formed in a form of film to be attached onto an inner surface of the rear cover 300 or a case including a conductive material may serve as an antenna.

The terminal body is provided with a power supplier 190 (see FIG. 1A) for supplying power to the mobile terminal 100. The power supplier 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear cover 300 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

Figure 2:
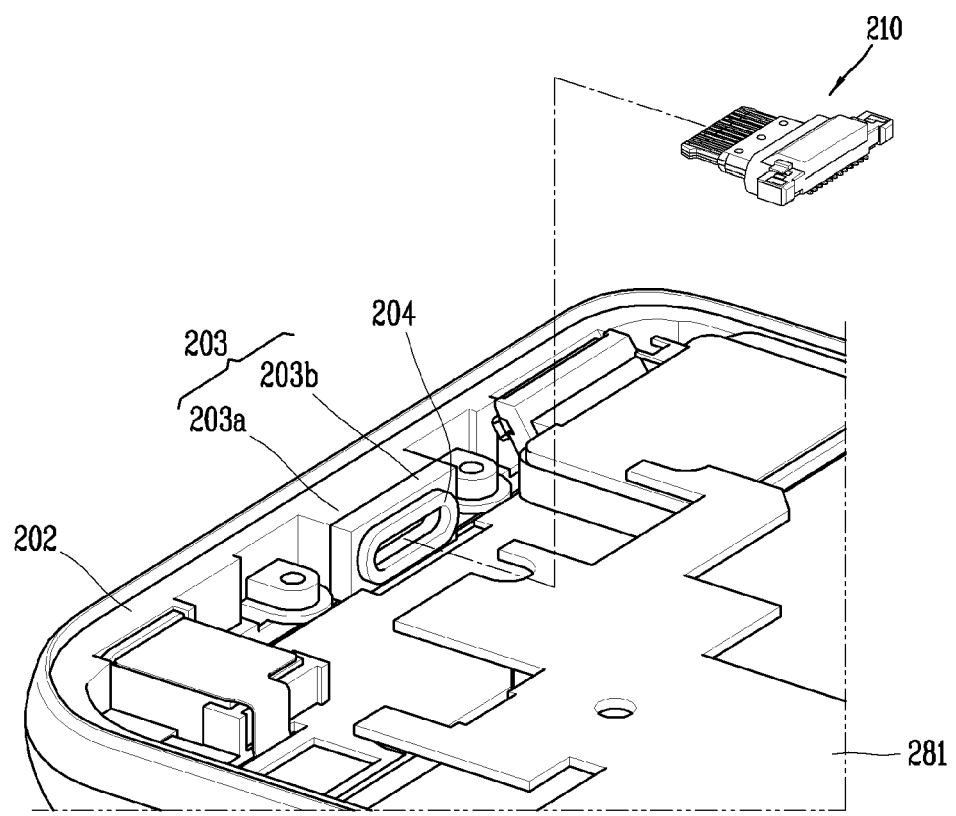
FIG. 2 is an exploded perspective view illustrating inside of the mobile terminal 200 according to the present disclosure.
Figure 3:
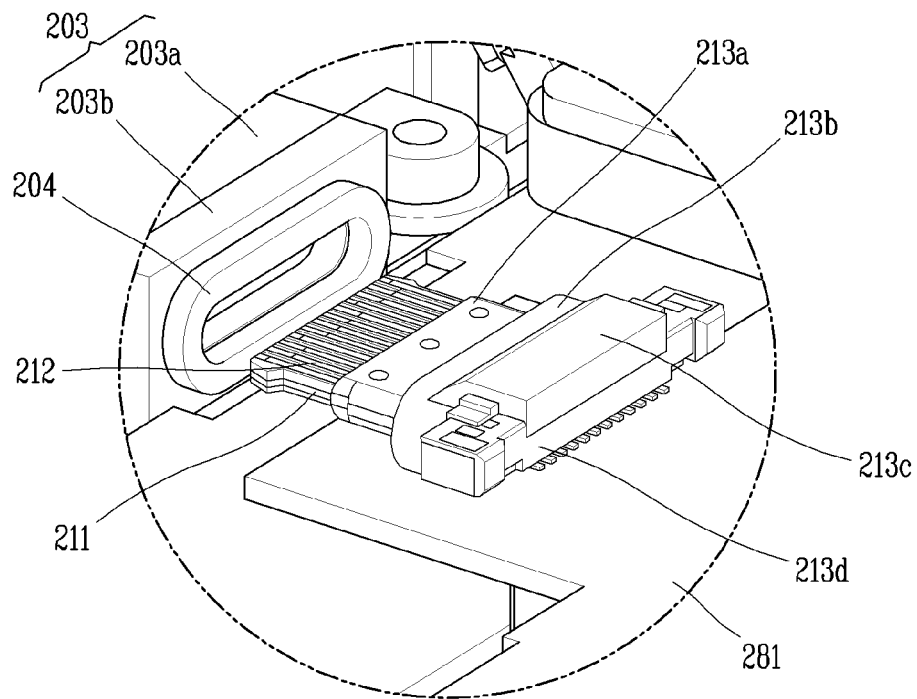
FIG. 3 is a perspective view illustrating a state in which a connector is being installed in a connector mounting portion.

FIG. 2 is an exploded perspective view illustrating inside of the mobile terminal 200 according to the present disclosure, and FIG. 3 is a perspective view illustrating a state in which a connector 210 is being installed in a connector mounting portion 203.

The mobile terminal 200 according to the present disclosure may include a display (not shown) mounted on a front surface portion of the mobile terminal 200, and a case 202 for fixing a circuit board 281. In this case, the case 202 may refer to the rear case 102 described above that defines an appearance and is provided for mounting components inside.

The case 202 may define an appearance of a side surface portion of the mobile terminal 200. The side surface portion of the mobile terminal 200 refers to a surface connecting a front surface and a rear surface, the side surface portion may be made of a metal member. The side surface portion may be made of a metal member to serve as a radiator of an antenna.

The side surface of the case 202 may be provided with the connection port for exchanging data with an external device 20 or for charging power, and the connector mounting portion 203 is formed through one side of the case 202. The connection port may refer to a USB port.

As illustrated in FIG. 2, in the mobile terminal 200 according to the present disclosure, the connector 210 is mounted in the connector mounting portion 203 after being directly coupled to the circuit board 281. A terminal portion 211 of the connector 210 to be described later may be inserted into the connector mounting portion 203 and then be connected to a plug 21 of the external device 20.

The connector mounting portion 203 may penetrate through one side of the case 202 so that the connector 210 can be inserted into the connector mounting portion 203, and the plug 21 of the external device 20 may be connected to the connector 210 of the mobile terminal 200 by being inserted in a direction from outside to inside of the mobile terminal 200. Here, the external device 20 may refer to a data storage or a power supply directly coupled to the plug 21.

The connector mounting portion 203 is provided at one side of the case 202. The connector mounting portion 203 may include a protrusion 203a coupled to the case 202 and protruding toward the connector 210, and a connector supporting portion 203b coupled to a front surface portion of the protrusion 203a and supporting the connector 210. Here, the front surface portion refers to an inward direction of the terminal. The protrusion 203a protrudes from an inner side surface of the case 202 and has a through hole provided to allow the connector 210 and the plug 21 of the external device to be coupled to each other. The protrusion 203a guides an insertion of the plug 21 for connection with the external device. The connector supporting portion 203b is coupled to the front surface portion of the protrusion 203a and supports one side of a connector body 213.

The connector 210 may include the connector body 213 and a terminal portion 211. The connector body 213 includes a pin supporting portion 213a covering an upper surface and a lower surface of the terminal portion 211 to support respective contact pins 212 and brought into contact with the external device, a stepped portion 213b protruding from the pin supporting portion 213a in an up-down direction and brought into contact with an inner side surface of the connector mounting portion 203, a case fixing portion 213c extending from an upper end portion of the stepped portion 213b and fixed to one side of the case 202, and a pin receptor portion 213d formed on a lower end portion of the case fixing portion 213c, supporting the contact pins 212 and connected to the circuit board 281.

At this time, the connector 210 may not be provided with an upper shell and a lower shell for supporting the connector 210, and therefore brackets for fastening the shells to the case 202 with screws are also unnecessary. Accordingly, the number of components required to configure the connection port may be reduced and this makes the structure simple.

In addition, in the mobile terminal 200 according to the present disclosure, the main circuit board 281 (hereinafter referred to as a circuit board) may be installed on one side of the case 202 as illustrated in FIG. 3. And the connector 210 may have a structure that can be directly coupled to the circuit board 281. When the connector 210 is directly coupled to the circuit board 281, the circuit board 281 coupled with the connector 210 can be integrally mounted into the connector mounting portion 203. This may simplify the fabricating process.

Here, the circuit board 281 may be configured in a '⊏' or 'C' shape, and a plurality of electronic elements (not shown) including driving chips (not shown) may be disposed on the circuit board 281. The circuit board 281 may transmit and process data through a connection with the external device 20, or charge a battery, and may be electrically connected to an antenna (not shown) so as to process radio signals (or radio electromagnetic waves) transmitted and received by the antenna.

On the other hand, in the related art, an O-ring is installed on a front end portion of the connector 210, the connector 210 is fixed to the flexible printed circuit board (FPCB) by additional brackets for fixing the O-ring, and the flexible printed circuit board has a structure coupled to the main circuit board 281. This configuration makes the fabricating process of the mobile terminal 200 complicated. In addition, the O-ring has a disadvantage in that breakage is likely to occur when assembling the connector 210 to the case 202, and even after the assembly it is difficult to figure out whether or not breakage has occurred.

Figure 4:
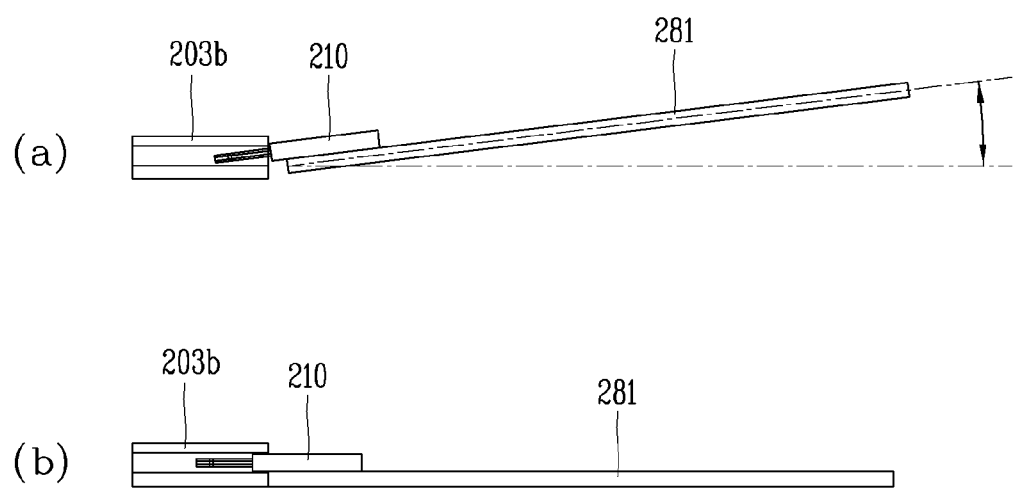
FIG. 4 is a conceptual view illustrating a state in which a connector is being placed in the connector mounting portion.

FIG. 4 is a conceptual view illustrating a state in which the connector 210 is being placed in the connector mounting portion 203.

As described above, in the mobile terminal 200 according to the present disclosure, the main circuit board 281 (hereinafter referred to as the circuit board) can be installed on one side of the case 202. And the connector 210 can be directly coupled to the circuit board 281 without being coupled to a separate flexible printed circuit board, since a separate O-ring is not mounted on the front end portion of the connector 210 so that brackets are not required to couple the connector 210 to the flexible printed circuit board.

As illustrated in FIG. 4, the mobile terminal 200 may be assembled in a manner of firstly coupling the connector 210 to the circuit board 281 for electrical coupling, and locating the connector 210 at the connector mounting portion 203 by tilting an angle of the circuit board 281, and then fixing the circuit board 281 to the case 202. When the connector 210 is directly coupled to the circuit board 281, the circuit board 281 coupled with the connector 210 can be integrally mounted into the connector mounting portion 203.

Thus, this can simplify the fabricating process of the mobile terminal 200 compared to the fabricating process of the related art mobile terminal of firstly fixing the flexible printed circuit board to the circuit board 281, coupling the connector 210 to the flexible printed circuit board through the brackets, and coupling the connector 210 to the circuit board 281 while fixing the circuit board 281 to the case 202.

Figure 5:
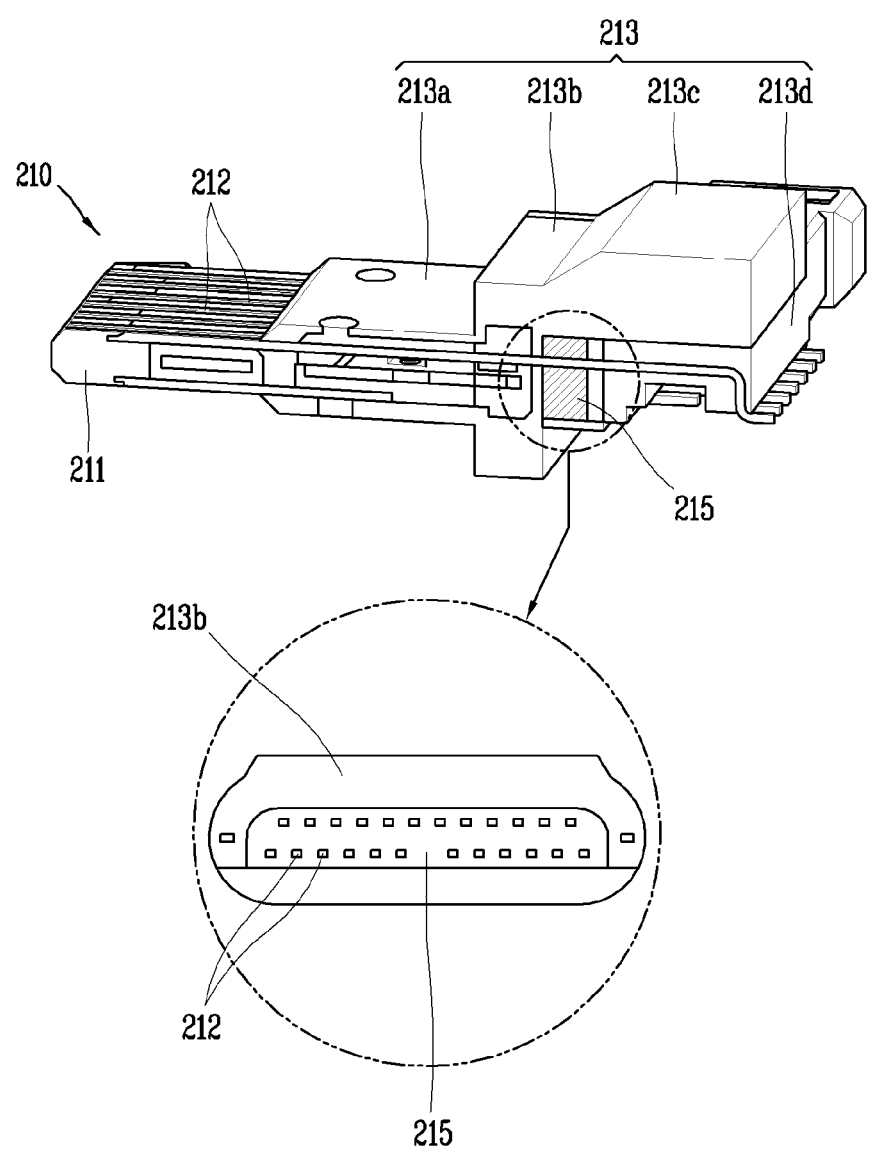
FIG. 5 is a perspective view illustrating an appearance the connector according to the present disclosure.
Figure 6:
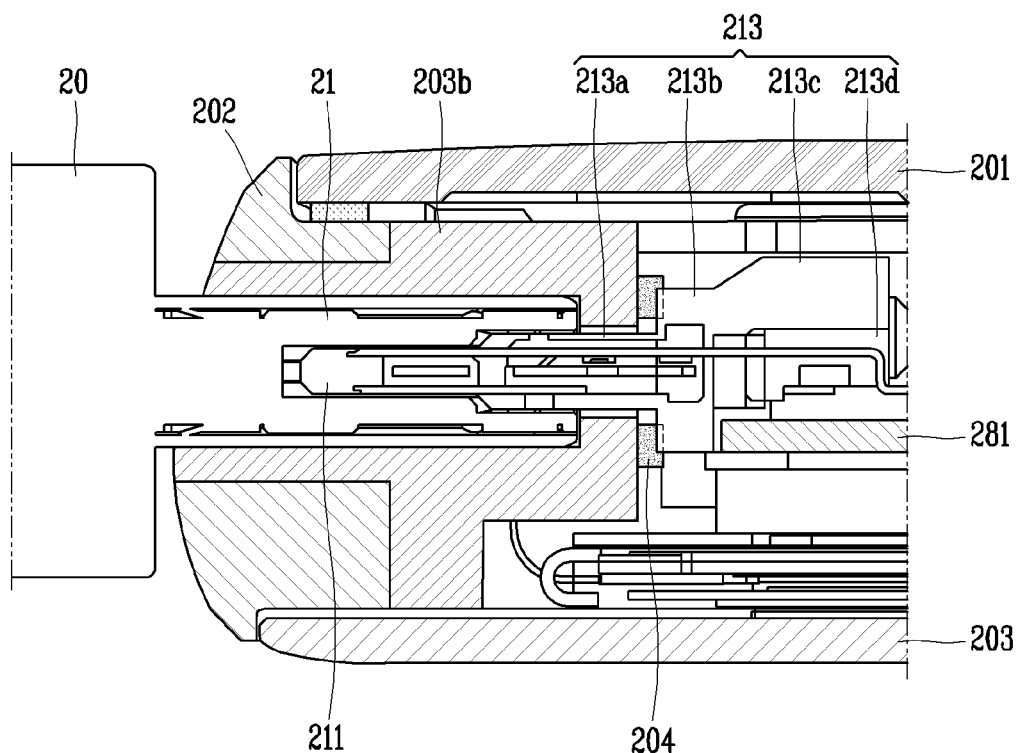
FIG. 6 is a cross-sectional view illustrating a state in which an external device is connected to the connector.

FIG. 5 is a perspective view illustrating an appearance the connector 210 according to the present disclosure, and FIG. 6 is a cross-sectional view illustrating a state in which an external device is connected to the connector 210.

The connector mounting portion 203 formed through one side of the case 202 is provided at a side surface of the case 202 to configure the connection port for transmitting and receiving data with the external device 20 or for charging power. And the connector 210 may be installed in the connector mounting portion 203 to be connected with the external device 20.

The connector 210 may include the connector body 213 and the terminal portion 211.

The connector body 213 defines the appearance, and may be seated on the connector mounting portion 203. And a rear end portion of the connector body 213 may be installed to be supported by the case 202. As illustrated in FIG. 5, the terminal portion 211 is formed on a front portion (a left side in FIG. 5) of the connector 210. The terminal portion 211 is coupled with the connector body 213, molded with a plurality of contact pins 212 for connection with the external device 20, and extends toward the connector mounting portion 203. As illustrated in FIG. 6, the terminal portion 211 has a structure coupled to the plug 21 of the external device inserted toward the connector mounting portion 203, and thus the plurality of contact pins 212 is exposed.

The connector body 213 includes the pin supporting portion 213a covering the upper surface and the lower surface of the terminal portion 211 to support the respective contact pins and brought into contact with the external device, the stepped portion 213b protruding from the pin supporting portion 213a in the up-down direction and brought into contact with the inner side surface of the connector mounting portion 203, the case fixing portion 213c extending from the upper end portion of the stepped portion 213b and fixed to the one side of the case 202, and the pin receptor portion 213d supporting the contact pins 212 and brought into contact with the circuit board 281 in the lower end portion of the case fixing portion 213c.

In the connector 210 of the mobile terminal 200 according to the present disclosure, the upper shell and the lower shell for supporting the connector 210 may be omitted and brackets for fastening the shells to the case 202 with screws are also unnecessary, unlike the related art. Thus, the connector 210 is simple in structure, and a fabricating cost can be reduced due to the reduction of the number of needed components.

The pin supporting portion 213a protrudes upward and downward from the terminal portion 211, and is brought into contact with the plug 21 of the external device inserted into the connector mounting portion 203, thereby preventing the terminal portion 211 and the plug 21 from being easily separated from each other.

The stepped portion 213b protrudes upward and downward from the pin supporting portion 213a and is brought into contact with the inner surface of the connector mounting portion 203. At this time, as illustrated in FIG. 6, a waterproofing member 204 may be installed between the connector mounting portion 203 and the stepped portion 213b of the connector body 213 to block the movement of the fluid 23 introduced through the connector mounting portion 203.

The connector mounting portion 203 is provided at one side of the case 202. The connector mounting portion 203 may include the protrusion 203a coupled to the case 202 and protruding toward the connector 210, and the connector supporting portion 203b coupled to the front surface portion of the protrusion 203a and supporting the connector 210. Here, the front surface portion refers to the inward direction of the terminal.

The waterproofing member 204 is attached to one surface of the connector supporting portion 203b and is brought into close contact with the stepped portion 213b. This prevents the fluid flowing into the connector mounting portion 203 from moving up and down to be introduced into the mobile terminal 200.

Figure 7:
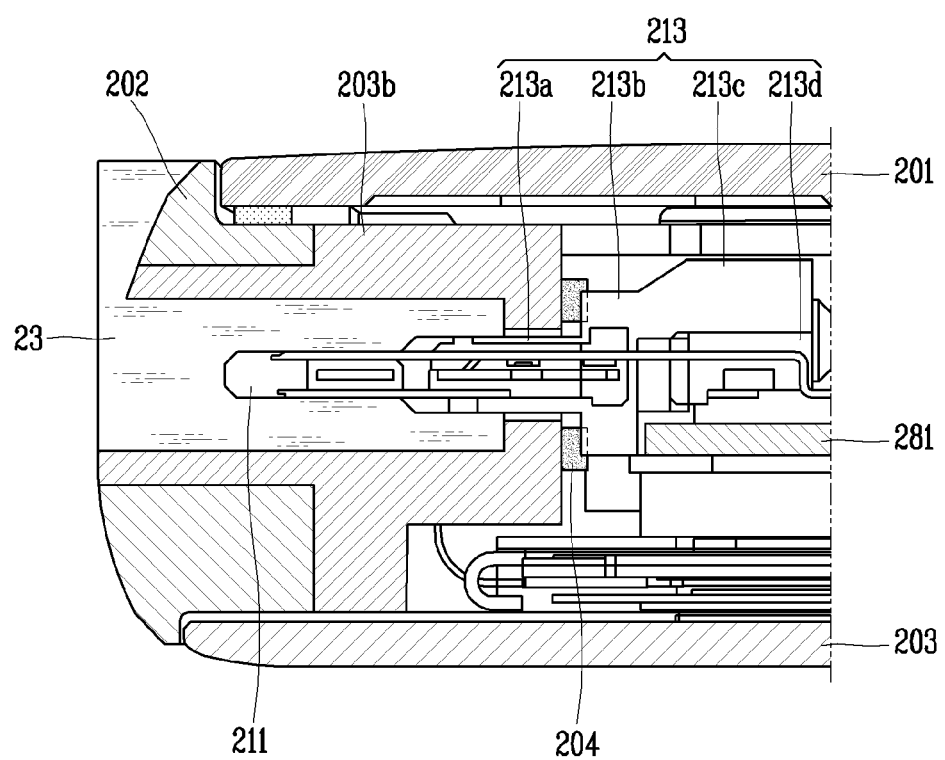
FIG. 7 is a cross-sectional view of the mobile terminal illustrating a state in which fluid is introduced through the connector mounting portion.

FIG. 7 is a view illustrating inside of the mobile terminal 200 according to the present disclosure, illustrating a state in which fluid is introduced through the connector mounting portion 203. The related art mobile terminal had a structure that the upper shell was covering the lower shell in which the connector 210 was accommodated. Thus, fluid might flow into not only the contact pins 212 mounted on the connector 210, but also a gap between the upper shell and the lower shell, and this needed to be prevented. However, in the mobile terminal 200 according to the present disclosure, the waterproofing member 204 is attached to one surface of the connector supporting portion 203b and is installed in close contact with the stepped portion 213b. And thus, this prevents the fluid flowing into the connector mounting portion 203 from moving up and down to be introduced into the mobile terminal 200. In addition, the waterproofing member 204 may be attached to one surface of the stepped portion 213b facing the connector supporting portion 203b.

The waterproofing member 204 may be made of a waterproof material blocking water inflow, and may mean a waterproof pad that can prevent movement of moisture. In addition, the waterproofing member 204 may be replaced with an O-ring having an elastic force.

In addition, as illustrated in FIG. 5, a waterproofing portion 215 may be installed on one side of the connector body 213 to ensure a waterproofing performance of the terminal.

The related art mobile terminal had a structure that the upper shell was covering the lower shell in which the connector 210 was accommodated. Thus, the fluid moving along the contact pins 212 and the fluid moving into the gap between the upper shell and the lower shell then flowing into the terminal, needed to be blocked.

However, since the mobile terminal 200 according to the present disclosure has the structure in which the connector 210 does not need to be coupled to a shell, waterproofing performance can be implemented only by blocking the fluid moving along the contact pins 212 molded on the connector body 213 from being introduced inside the terminal.

The waterproofing portion 215 may be made of a material capable of implementing waterproofing performance to block inflow of fluid, and may be installed to surround and closely contact the outer surface of each of the contact pins 212. For example, the waterproofing portion 215 may be made of a silicon material.

The inflow of fluid moving along the surface of the plurality of contact pins 212 can be blocked by the waterproofing portion 215 installed on the connector body 213. This may result in suppressing deterioration of the performance of the electronic elements and the circuit board 281 located inside the terminal due to the introduced fluid, thereby preventing reliability of the terminal from being lowered.

Specifically, the waterproofing portion 215 may be installed in a space created by the case fixing portion 213c and the pin receptor portion 213d at the lower portion of the case fixing portion 213c, and may block inflow of the fluid passing through the stepped portion 213b and moving along the surface of the plurality of contact pins 212. The waterproofing portion 215 is molded with the contact pins 212, thereby preventing the fluid from flowing into the terminal along the contact pins 212.

The waterproofing portion 215 needed to be installed high up and low down to block inflow of fluid since the related art mobile terminal had a structure that the upper shell and the lower shell were surrounding the connector 210. But in the embodiment of the present disclosure, sufficient waterproofing performance can be secured by installing the waterproofing portion 215 only in a space created by the case fixing portion 213c and the pin receptor portion 213d.

Figure 8:
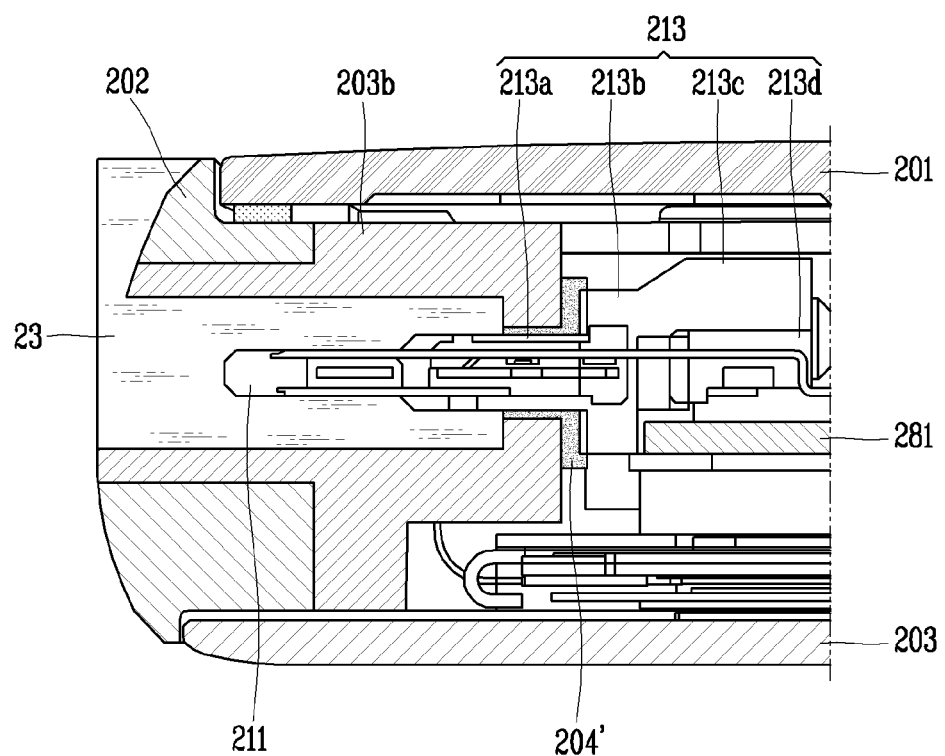
FIG. 8 is a cross-sectional view illustrating an embodiment different from the mobile terminal in FIG. 7.

FIG. 8 is a cross-sectional view illustrating an embodiment different from the mobile terminal in FIG. 7, and illustrating a state in which a modified waterproofing member 204' is installed.

The connector mounting portion 203 is provided at one side of the case 202. The connector mounting portion 203 may include the protrusion 203a coupled to the case 202 and protruding toward the connector 210, and a connector supporting portion 203b coupled to the front surface portion of the protrusion 203a and supporting the connector 210. Here, the front surface portion refers to the inward direction of the terminal.

In the mobile terminal 200 according to the present disclosure, a waterproofing member 204' is attached to one surface of the connector supporting portion 203b and is installed in close contact with the stepped portion 213b. This configuration prevents the fluid flowing into the connector mounting portion 203 from moving up and down to be introduced into the mobile terminal 200.

The waterproofing member 204' is attached to one surface of the connector supporting portion 203b and is installed between the connector mounting portion 203 and the stepped portion 213b of the connector body 213, thereby blocking the fluid introducing through the connector mounting portion 203.

In this case, the waterproofing member 204' is not attached only to the surface of the connector supporting portion 203b, but integrally covers one surface of the connector supporting portion 203b and an inner surface of a hole in the connector supporting portion 203b. And this configuration can block the fluid flowing from the connector mounting portion 203 from being introduced inside the terminal. At this time, the thickness of the waterproofing member 204' may be determined in consideration of the gap between the stepped portion 213b of the connector 210 and the inner surface of the connector mounting portion 203.

In addition, the waterproofing member 204' may be installed to be closely adhered and compressed between the stepped portion 213b and the connector supporting portion 203b to limit the movement of the fluid introduced through the connector mounting portion 203. Accordingly, the waterproofing member 204' should be made of a waterproof material to block water inflow.

The detailed description should not be limitedly interpreted in all the aspects and should be understood to be illustrative. Therefore, all changes and modifications that fall within the metes and bounds of the claims, or equivalents of such metes and bounds are therefore intended to be embraced by the appended claims.

INDUSTRIAL APPLICABILITY

The present disclosure may be variously implemented and applied in an industrial field for producing and using mobile terminals provided with connection terminals for connecting external devices.

The invention claimed is:

1. A mobile terminal comprising:
a case;
a circuit board installed in the case;
a connector mounting portion formed through one side of the case to be connected with an external device; and
a connector coupled to the circuit board and installed in the connector mounting portion,
wherein the connector comprises:
  a connector body seated on the connector mounting portion and having a rear end portion installed to be supported by the case; and
  a terminal portion coupled to the connector body, having a plurality of contact pins molded thereto for connection with the external device, and extending toward the connector mounting portion,
wherein a waterproofing member is installed between the connector mounting portion and the connector body to prevent fluid from being introduced through the connector mounting portion,
wherein the connector body comprises a pin receptor portion installed at one end of the connector body, and
wherein the pin receptor portion supports the plurality of contact pins extending from the terminal portion to the one end of the connector and contacts the circuit board.

2. The mobile terminal of claim 1, wherein the connector body further comprises:
a pin supporting portion covering an upper surface and a lower surface of the terminal portion to support the respective contact pins and brought into contact with the external device;
a stepped portion protruding from the pin supporting portion in an up and down direction, and inserted into the connector mounting portion to be in contact with an inner side surface of the connector mounting portion; and
a case fixing portion extending from an upper end portion of the stepped portion to be fixed to the one side of the case.

3. The mobile terminal of claim 2, wherein a waterproofing portion is installed in a space created by the case fixing portion and the pin receptor portion, and is molded with the respective contact pins so as to prevent the fluid from flowing along a surface of each contact point over the stepped portion.

4. The mobile terminal of claim 3, wherein the waterproofing portion is made of a waterproof material to prevent introduction of the fluid, and be installed to surround an outer side surface of each contact pin in a close contact manner.

5. The mobile terminal of claim 1, wherein the connector mounting portion comprises:
a protrusion protruding toward the connector; and
a connector supporting portion coupled to a front surface portion of the protrusion to support the connector.

6. The mobile terminal of claim 5, wherein the protrusion guides an insertion of a plug for connection with the external device.

7. The mobile terminal of claim 5, wherein the waterproofing member is positioned to be attached to one surface of the connector supporting portion and be in close contact with the connector body, and prevents the fluid from being introduced from the connector mounting portion.

8. The mobile terminal of claim 7, wherein the waterproofing member is implemented as an O-ring.

9. The mobile terminal of claim 8, wherein the waterproofing member integrally covers one surface of the connector supporting portion and an inner side surface of a hole formed in the connector supporting portion, so as to prevent introduction of the fluid from outside.

* * * * *